(12) United States Patent
Shabi et al.

(10) Patent No.: US 12,443,573 B2
(45) Date of Patent: Oct. 14, 2025

(54) SYSTEM AND METHOD FOR PERFORMING UNALIGNED DEDUPLICATION

(71) Applicant: Dell Products, L.P., Round Rock, TX (US)

(72) Inventors: Uri Shabi, Tel Mond (IL); Mark Abashkin, Erez (IL); Bar Harel, Giv'atayim (IL)

(73) Assignee: Dell Products L.P., Round Rock, TX (US)

( * ) Notice: Subject to any disclaimer, the term of this patent is extended or adjusted under 35 U.S.C. 154(b) by 161 days.

(21) Appl. No.: 17/889,590

(22) Filed: Aug. 17, 2022

(65) Prior Publication Data

US 2024/0061819 A1 Feb. 22, 2024

(51) Int. Cl.
*G06F 16/215* (2019.01)
*G06F 16/22* (2019.01)

(52) U.S. Cl.
CPC ........ *G06F 16/215* (2019.01); *G06F 16/2255* (2019.01)

(58) Field of Classification Search
None
See application file for complete search history.

(56) References Cited

U.S. PATENT DOCUMENTS

| | | | | |
|---|---|---|---|---|
| RE45,086 E * | 8/2014 | Coldewey | ........... | G06F 12/0862 711/204 |
| 10,565,183 B1 * | 2/2020 | Colgrove | ........... | G06F 16/2365 |
| 11,429,587 B1 * | 8/2022 | Barrell | ........... | G06F 16/215 |
| 2012/0226672 A1 * | 9/2012 | Hayashi | ........... | G06F 16/1752 707/698 |
| 2014/0143213 A1 * | 5/2014 | Tal | ........... | G06F 16/2272 707/692 |
| 2014/0279954 A1 * | 9/2014 | Aronovich | ........... | G06F 16/278 707/692 |
| 2016/0026653 A1 * | 1/2016 | Caro | ........... | G06F 16/1752 707/692 |
| 2019/0026042 A1 * | 1/2019 | Gupta | ........... | G06F 16/215 |
| 2019/0370113 A1 * | 12/2019 | Zhao | ........... | G06F 9/545 |
| 2021/0064659 A1 * | 3/2021 | O'Hare | ........... | H03M 7/3091 |
| 2021/0342297 A1 * | 11/2021 | Gupta | ........... | G06F 16/128 |
| 2023/0267217 A1 * | 8/2023 | Natanzon | ........... | G06F 21/602 713/193 |

* cited by examiner

*Primary Examiner* — Aleksandr Kerzhner
*Assistant Examiner* — Anugeetha Kunjithapatham
(74) *Attorney, Agent, or Firm* — Brian J. Colandreo; Heath M. Sargeant; Holland & Knight LLP (57) ABSTRACT

A method, computer program product, and computing system for receiving a user data page for storing in a storage system. An unaligned hash representation of the received user data page may be generated. The generated unaligned hash representation may be identified within a hash table, thus defining an identified hash representation. A user data page associated with the identified hash representation may be identified, thus defining an identified user data page. A hash offset reference of the identified user data page may be compared with a hash offset reference of the received user data page. A deduplication operation may be performed on the received user data page based upon, at least in part, the comparison of the hash offset reference of the identified user data page with the hash offset reference of the received user data page.

14 Claims, 7 Drawing Sheets

SYSTEM AND METHOD FOR PERFORMING UNALIGNED DEDUPLICATION

BACKGROUND

Storing and safeguarding electronic content may be beneficial in modern business and elsewhere. Accordingly, various methodologies may be employed to protect and distribute such electronic content.

Conventional approaches to aligned and unaligned deduplication require the use of separate hash tables for aligned hashes and unaligned hashes. As such, conventional approaches typically perform search of aligned hashes upon which to perform aligned deduplication operations and then, separately, a search of unaligned hashes upon which to perform unaligned deduplication operations.

SUMMARY OF DISCLOSURE

In one example implementation, a computer-implemented method executed on a computing device may include, but is not limited to, receiving a user data page for storing in a storage system. An unaligned hash representation of the received user data page may be generated. The generated unaligned hash representation may be identified within a hash table, thus defining an identified hash representation. A user data page associated with the identified hash representation may be identified, thus defining an identified user data page. A hash offset reference of the identified user data page may be compared with a hash offset reference of the received user data page. A deduplication operation may be performed on the received user data page based upon, at least in part, the comparison of the hash offset reference of the identified user data page with the hash offset reference of the received user data page.

One or more of the following example features may be included. Performing the deduplication operation may include performing a first type of deduplication operation when the hash offset reference of the identified page and the hash offset reference of the received user data page are equivalent. The first type of deduplication operation may be an aligned deduplication operation. Performing the deduplication operation may include performing a second type deduplication operation when the hash offset reference of the identified page and the hash offset reference of the received user data page are nonequivalent. The second type of deduplication operation may be an unaligned deduplication operation. It may be determined that the generated unaligned hash representation of the received user data page is not present within the hash table. The generated unaligned hash representation of the received user data page may be stored in the hash table.

In another example implementation, a computer program product resides on a computer readable medium that has a plurality of instructions stored on it. When executed by a processor, the instructions cause the processor to perform operations that may include, but are not limited to, receiving a user data page for storing in a storage system. An unaligned hash representation of the received user data page may be generated. The generated unaligned hash representation may be identified within a hash table, thus defining an identified hash representation. A user data page associated with the identified hash representation may be identified, thus defining an identified user data page. A hash offset reference of the identified user data page may be compared with a hash offset reference of the received user data page. A deduplication operation may be performed on the received user data page based upon, at least in part, the comparison of the hash offset reference of the identified user data page with the hash offset reference of the received user data page.

One or more of the following example features may be included. Performing the deduplication operation may include performing a first type of deduplication operation when the hash offset reference of the identified page and the hash offset reference of the received user data page are equivalent. The first type of deduplication operation may be an aligned deduplication operation. Performing the deduplication operation may include performing a second type deduplication operation when the hash offset reference of the identified page and the hash offset reference of the received user data page are nonequivalent. The second type of deduplication operation may be an unaligned deduplication operation. It may be determined that the generated unaligned hash representation of the received user data page is not present within the hash table. The generated unaligned hash representation of the received user data page may be stored in the hash table.

In another example implementation, a computing system includes at least one processor and at least one memory architecture coupled with the at least one processor, wherein the at least one processor is configured to receive a user data page for storing in a storage system. An unaligned hash representation of the received user data page may be generated. The generated unaligned hash representation may be identified within a hash table, thus defining an identified hash representation. A user data page associated with the identified hash representation may be identified, thus defining an identified user data page. A hash offset reference of the identified user data page may be compared with a hash offset reference of the received user data page. A deduplication operation may be performed on the received user data page based upon, at least in part, the comparison of the hash offset reference of the identified user data page with the hash offset reference of the received user data page.

One or more of the following example features may be included. Performing the deduplication operation may include performing a first type of deduplication operation when the hash offset reference of the identified page and the hash offset reference of the received user data page are equivalent. The first type of deduplication operation may be an aligned deduplication operation. Performing the deduplication operation may include performing a second type deduplication operation when the hash offset reference of the identified page and the hash offset reference of the received user data page are nonequivalent. The second type of deduplication operation may be an unaligned deduplication operation. It may be determined that the generated unaligned hash representation of the received user data page is not present within the hash table. The generated unaligned hash representation of the received user data page may be stored in the hash table.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
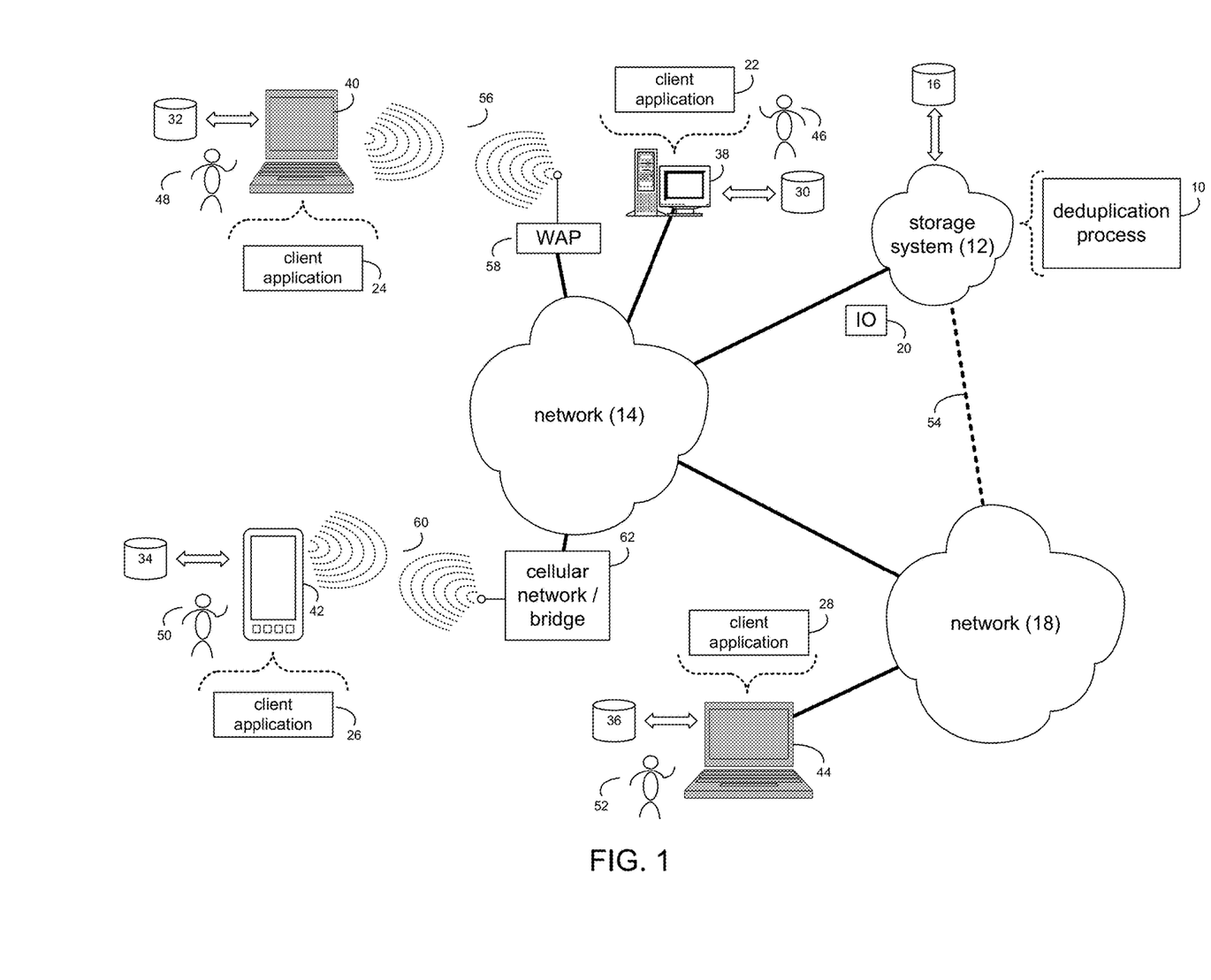
FIG. 1 is an example diagrammatic view of a storage system and a deduplication process coupled to a distributed computing network according to one or more example implementations of the disclosure.

System Overview:

Referring to FIG. 1, there is shown deduplication process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of deduplication process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of deduplication process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a deduplication process, such as deduplication process 10 of FIG. 1, may include but is not limited to, receiving a user data page for storing in a storage system. An unaligned hash representation of the received user data page may be generated. The generated unaligned hash representation may be identified within a hash table, thus defining an identified hash representation. A user data page associated with the identified hash representation may be identified, thus defining an identified user data page. A hash offset reference of the identified user data page may be compared with a hash offset reference of the received user data page. A deduplication operation may be performed on the received user data page based upon, at least in part, the comparison of the hash offset reference of the identified user data page with the hash offset reference of the received user data page.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
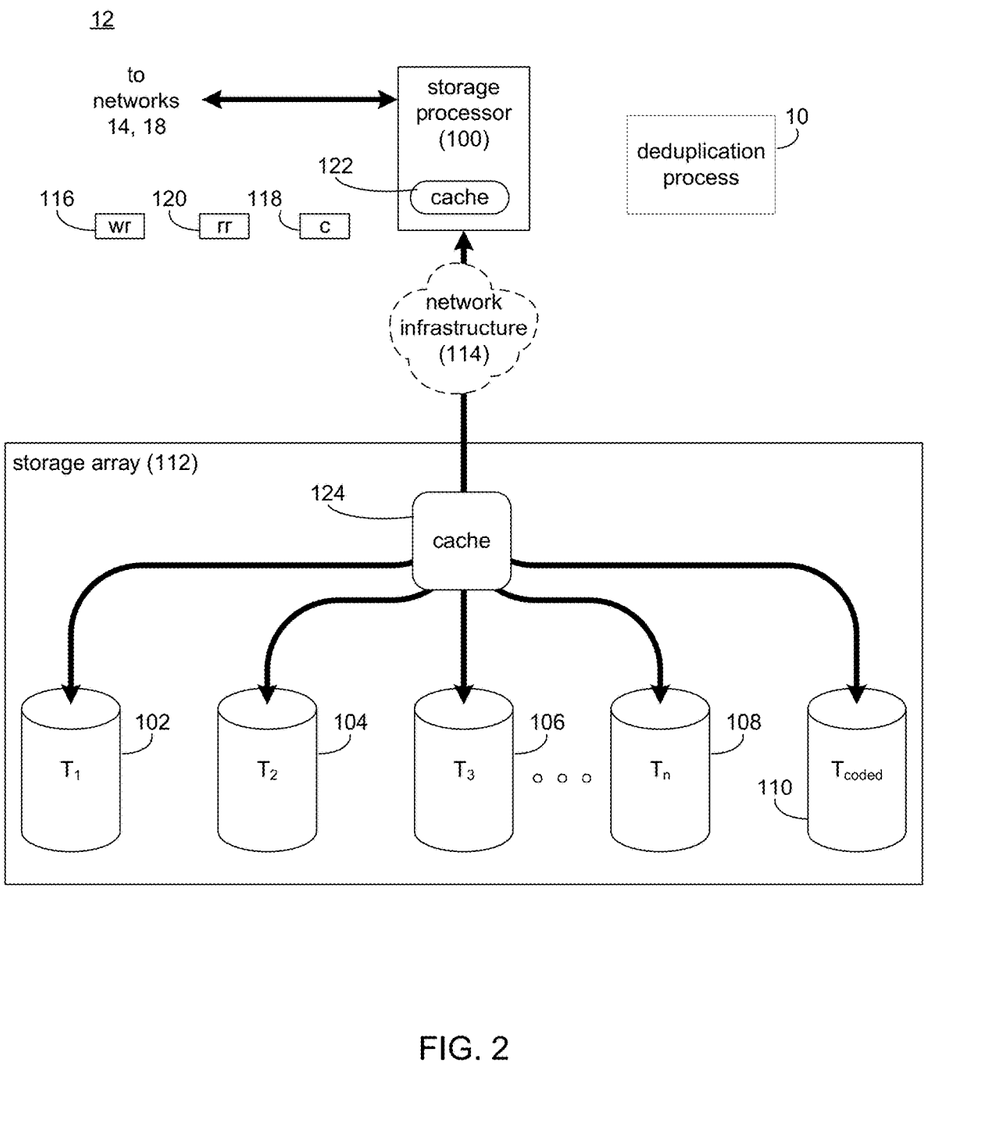
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form storage array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of deduplication process 10. The instruction sets and subroutines of deduplication process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of deduplication process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to storage array 112 (if frontend cache memory system 122 is configured as a write-through cache) or may subsequently write content 118 to storage array 112 (if frontend cache memory system 122 is configured as a write-back cache).

Storage array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of storage array 112, content 118 to be written to storage array 112 may be received from storage processor 100. Storage array 112 may initially store content 118 within backend cache memory system 124 prior to being stored on e.g. one or more of storage targets 102, 104, 106, 108, and coded target 110.

As discussed above, the instruction sets and subroutines of deduplication process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of deduplication process 10 may be executed by one or more processors (not shown) and one or more memory architectures (not shown) included within storage array 112.

Further and as discussed above, during the operation of storage array 112, content (e.g., content 118) to be written to storage array 112 may be received from storage processor 100 and initially stored within backend cache memory system 124 prior to being stored on e.g. one or more of storage targets 102, 104, 106, 108, 110. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Deduplication Process:

Referring also to the examples of FIGS. 3-7 and in some implementations, deduplication process 10 may receive 300 a user data page for storing in a storage system. An unaligned hash representation of the received user data page may be generated 302. The generated unaligned hash representation may be identified 304 within a hash table, thus defining an identified hash representation. A user data page associated with the identified hash representation may be identified 306, thus defining an identified user data page. A hash offset reference of the identified user data page may be compared 308 with a hash offset reference of the received user data page. A deduplication operation may be performed 310 on the received user data page based upon, at least in part, the comparison of the hash offset reference of the identified user data page with the hash offset reference of the received user data page.

As will be discussed in greater detail below, implementations of the present disclosure may allow for both aligned and unaligned deduplication within a storage system using a single hash table. For example, conventional approaches to aligned and unaligned deduplication require the use of separate hash tables for aligned hashes and unaligned hashes. As such, conventional approaches typically perform search of aligned hashes upon which to perform aligned deduplication operations and, separately, a search of unaligned hashes upon which to perform unaligned deduplication operations. As will be discussed in greater detail below, deduplication process 10 may consolidate the hashes generated and searched during deduplication to only unaligned hashes. In this manner, deduplication process 10 may determine whether to perform aligned or unaligned deduplication using unaligned hashes and hash offset references defined for various user data pages.

Figure 4:
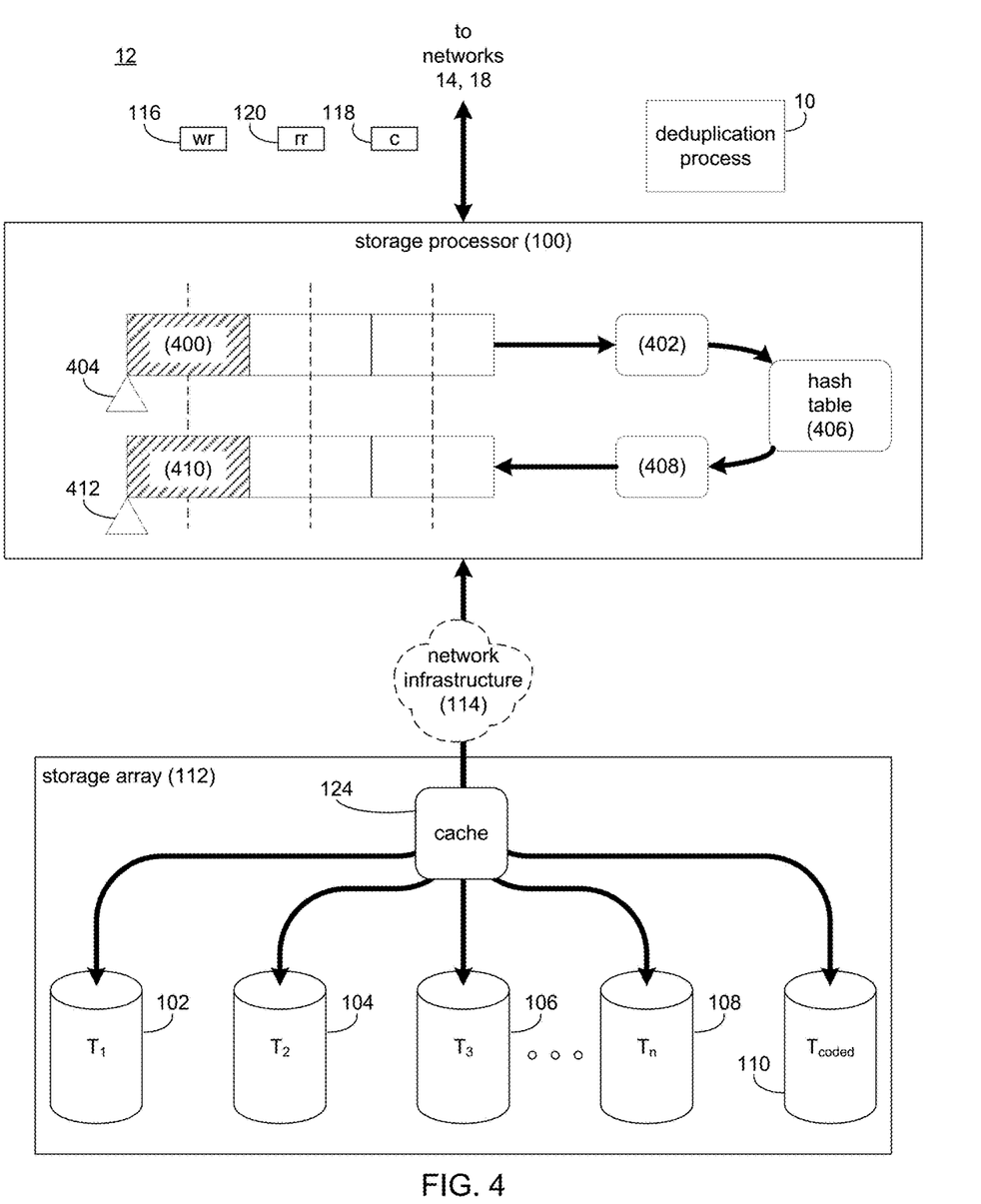
FIGS. 4-7 are example diagrammatic views of the storage system of FIG. 1 according to various example implementations of the disclosure.

In some implementations, deduplication process 10 may receive 300 a user data page for storing in a storage system. For example, a user data page may be a predefined amount of data used for storing "user data" (i.e., data stored in a storage system during a user's interaction with the storage system). In one example, the user data page may be e.g., 4 kilobytes. However, it will be appreciated that this is for example purposes only as the user data page may be any size within the scope of the present disclosure. Referring also to FIG. 4 and in some implementations, a storage processor (e.g., storage processor 100) may receive a user data page (e.g., user data page 400) for storing in a storage system (e.g., storage system 12). In this example, user data page 400 may be e.g., a 4 kilobyte page of data.

Figure 3:
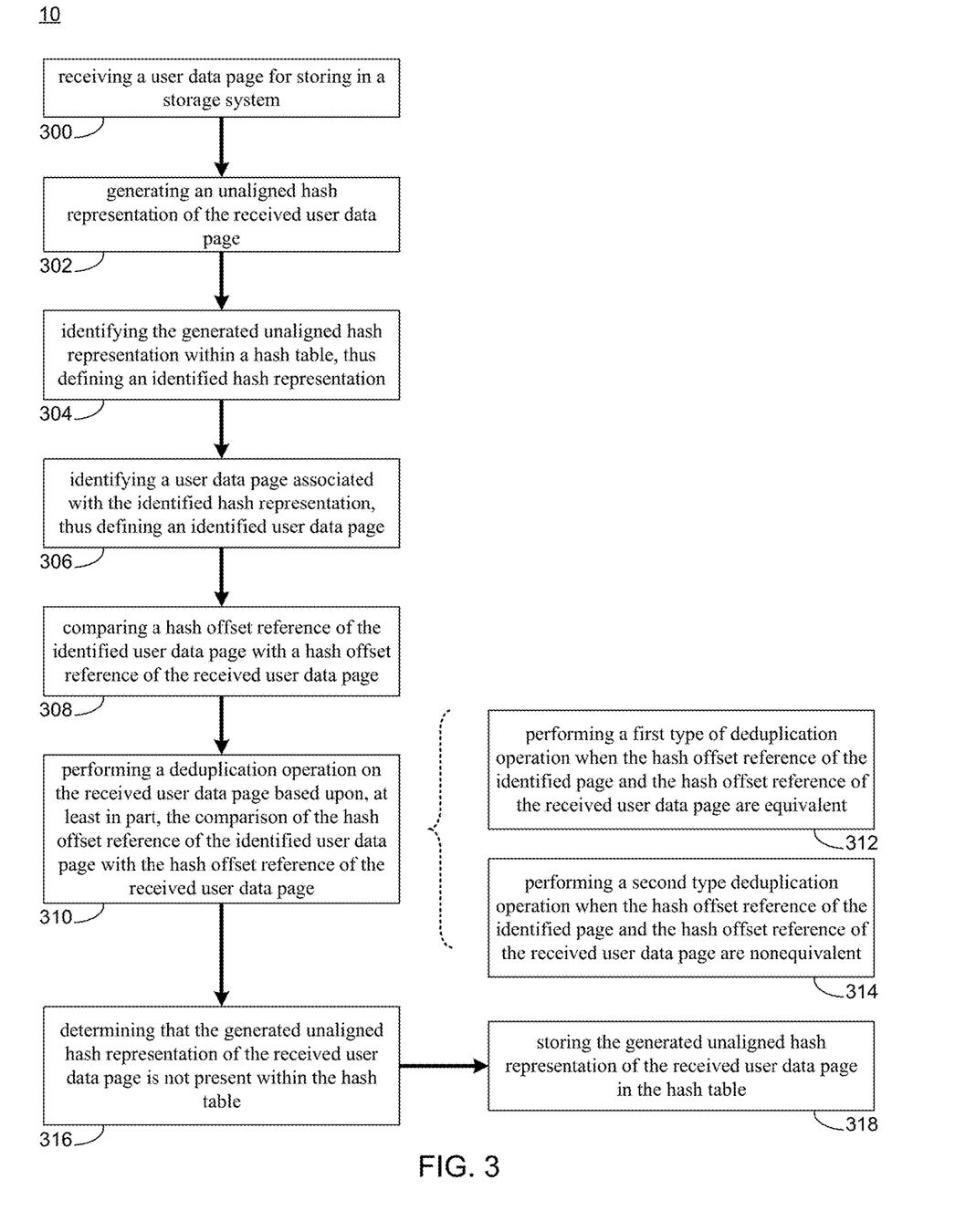
FIG. 3 is an example flowchart of deduplication process according to one or more example implementations of the disclosure.

In some implementations, deduplication process 10 may generate 302 an unaligned hash representation of the user data page. For example, an unaligned hash representation may generally include the result of performing a hash calculation on the user data page. Various hash calculations or algorithms may be utilized to generate 302 an unaligned hash representation of the user data page within the scope of the present disclosure. The "unaligned" hash representation may be a hash representation that is not aligned to a particular page or size. In this manner, deduplication process 10 may reduce the size of the hash table by including only unaligned hash representations of user data pages. As discussed above, conventional approaches require the generation of aligned hash representations and unaligned hash representations. Deduplication process 10 may provide an enhance the storage system performance by reducing the number of hash representations to store and search as new user data pages are added to the storage system.

In some implementations, generating 302 the unaligned hash representation may include defining a hash offset reference or "anchor point" for the user data page. For example and as is known in the art, deduplication process 10 may deterministically define a hash offset reference to determine the starting location within the user data page for generating the hash representation. Determining the hash offset reference may include generating a hash for each e.g., byte of the user data page and utilizing these hashes to select a particular byte in the user data page to be the hash offset reference. In one example, the hash offset reference is the highest local maximal point of the user data page determined from the hashes of each byte. In this manner, the hash offset reference may be consistently determined for this user data page. While one example of how the hash offset reference may be determined has been described, it will be appreciated that this is for example purposes only and that any deterministic approach may be used within the scope of the present disclosure. In some implementations, deduplication process 10 may generate an unaligned hash starting at the hash offset reference.

Referring again to FIG. 4, deduplication process 10 may generate 302 an unaligned hash representation (e.g., unaligned hash representation 402) of user data page 400. For example, deduplication process 10 may determine the hash offset reference (e.g., hash offset reference 404) for user data page 400 and may generate unaligned hash representation 402 starting from hash offset reference 404.

In some implementations, deduplication process 10 may identify 304 the generated unaligned hash representation within a hash table, thus defining an identified hash representation. For example, deduplication process 10 may utilize the generated unaligned hash representation to search a hash table for user data pages that may allow for deduplication. The hash table may be generated by storing new and unique hash representations corresponding to stored user data pages. In this manner, the hash table may indicate which user data pages are available for deduplication operations. For example, if a hash representation is identified (e.g., matches based on a predefined threshold of similarity) in the hash table, the user data page corresponding to the identified hash representation may be identified and compared with the received user data page for performing a deduplication operation.

Referring again to FIG. 4, suppose that deduplication process 10 compares unaligned hash representation 402 with the hash representations of the hash table (e.g., hash table 406) and identifies 304 a matching hash representation (e.g., hash representation 408). In this example, the user data page corresponding to the identified hash representation (e.g., hash representation 408) may be obtained for comparing against user data page to determine if a deduplication operation can be performed.

In some implementations, deduplication process 10 may identify 306 a user data page associated with the identified hash representation, thus defining an identified user data page. As discussed above, deduplication process 10 may utilize hash table 406 to store hash representations for various user data pages stored in storage system 12. However, a matching hash representation does not guarantee that the corresponding user data pages match. As such, deduplication process 10 may identify 306 a user data page associated with the identified hash representation for comparing with the received user data page. If the user data pages are equivalent, a deduplication operation may be performed. If the user data pages are not equivalent, the user data page may be stored in the storage system.

Referring again to FIG. 4, deduplication process 10 may, in response to identifying 304 hash representation 408 that matches (e.g., based on a predefined threshold of similarity) generated unaligned hash representation 402, identify 306 a user data page (e.g., user data page 410) associated with identified hash representation 408. In one example, user data page 410 may be identified from a storage array (e.g., storage array 112) and/or from a cache memory system (e.g., cache 122) of storage system 12. In this example, deduplication process 10 may read user data page 410 for comparing with received user data page 400.

In some implementations, deduplication process 10 may compare 308 a hash offset reference of the identified user data page with a hash offset reference of the received user data page. For example and as discussed above, a hash offset reference may be a deterministically defined anchor point in a user data page that indicates where to start performing a hash operation on the user data page. Accordingly, deduplication process 10 may compare 308 the hash offset references of each user data page to determine whether the user data pages are aligned. In some implementations, the hash offset reference may be stored in the hash representation, in the user data page, or derived from the user data page.

Referring again to FIG. 4, suppose that deduplication process 10 determines that user data page 400 has hash offset reference 404 and that identified user data page 410 has hash offset reference 412. In this example, deduplication process 10 may compare 308 hash offset reference 404 and hash offset reference 412 to determine a difference between them. For example, the difference may indicate whether or not the user data pages are aligned and, as such, subject to different types of deduplication operations.

In some implementations, deduplication process 10 may perform 310 a deduplication operation on the user data page based upon, at least in part, the comparison of the hash offset reference of the identified user data page with the hash offset reference of the received user data page. For example and as discussed above, conventional approaches to deduplication require the management and searching of aligned hash tables to perform aligned deduplication and unaligned hash tables to perform unaligned deduplication. Deduplication process 10 may utilize the comparison of the hash offset references of the identified user data page and the received user data page to determine which type of deduplication operation to perform.

For example, performing 310 the deduplication operation may include performing 312 a first type of deduplication operation when the hash offset reference of the identified page and the hash offset reference of the received user data page are equivalent. Referring again to FIG. 4, suppose that deduplication process 10 determines that hash offset reference 412 of identified user data page 410 and hash offset reference 404 of received user data page 400 are determined to be equivalent (i.e., no difference between hash offset references). In this example, deduplication process 10 may perform a first type of deduplication operation (i.e., an aligned deduplication operation) as the hash offset references indicate that user data pages 400, 410 are aligned. Performing an aligned deduplication operation may generally include comparing portions of user data pages that are aligned to identify equivalent user data pages for deduplication. Deduplication process 10 may then store received user data page 400 as a metadata page that references identified user data page 410 such that only one copy of the content of user data page 410 is stored along with a smaller metadata page. As shown in FIG. 4, because identified user data page 410 and received data page 400 are aligned (e.g., no difference between hash offset references 404, 412), deduplication process 10 may perform deduplication on a single page range (i.e., length in memory of a single page). As will be discussed in greater detail below, unaligned deduplication may utilize a range of at least two pages for deduplication (as the unalignment will extend at least beyond the length of a single page).

Figure 5:
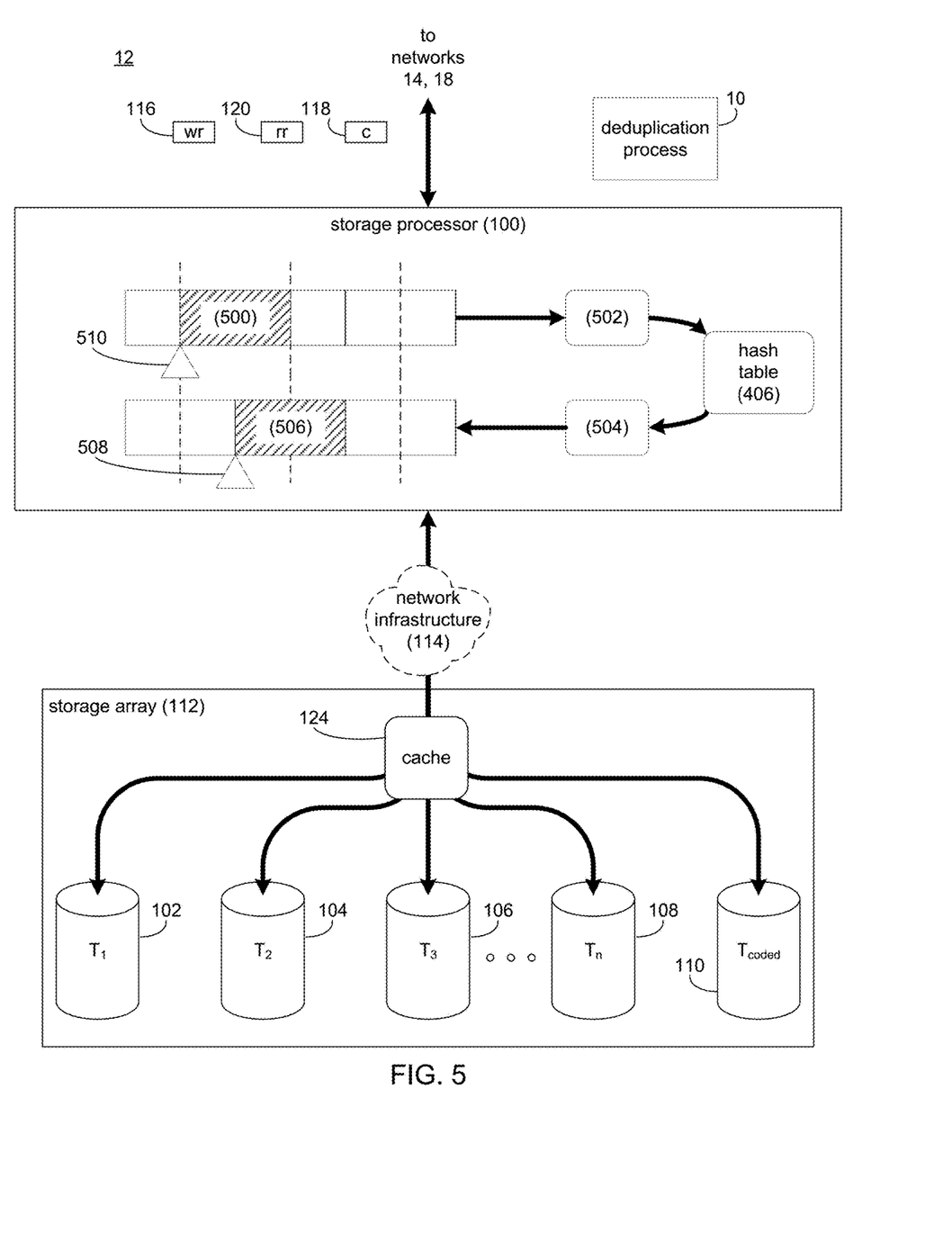

In some implementations, performing 310 the deduplication operation may include performing 314 a second type deduplication operation when the hash offset reference of the identified user data page and the hash offset reference of the received user data page are nonequivalent. Referring also to FIG. 5, suppose that deduplication process 10 receives 300 user data page 500, generates unaligned hash representation 502, identifies hash representation 504 and user data page 506. In this example, further suppose that deduplication process 10 determines that hash offset reference 508 of identified user data page 506 and hash offset reference 510 of received user data page 500 are determined to be nonequivalent (i.e., a difference between hash offset references). In this example, deduplication process 10 may perform a second type of deduplication operation (i.e., an unaligned deduplication operation) as the hash offset references indicate that user data pages 500, 506 are unaligned.

Figure 6:
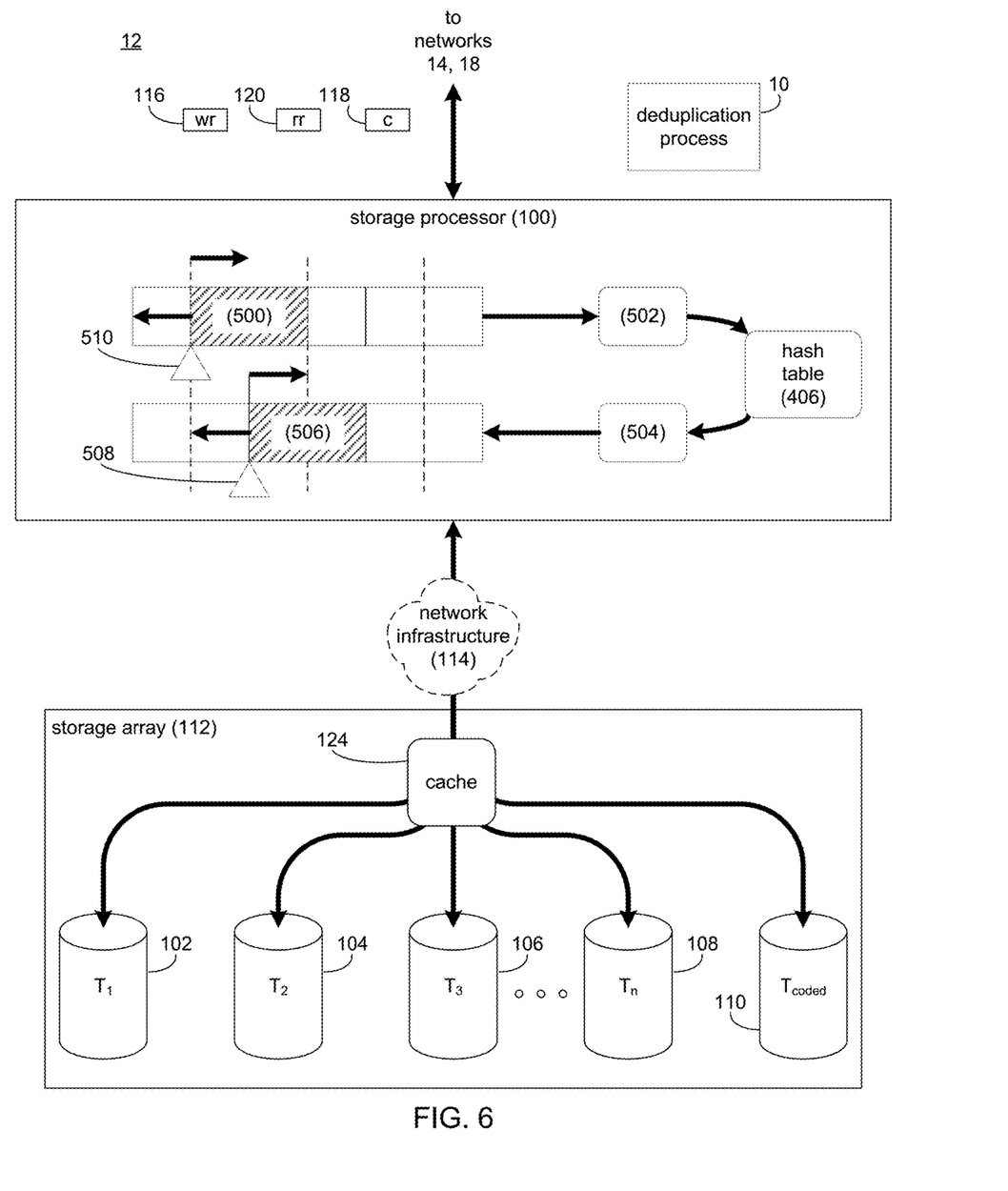

In some implementations, performing an unaligned deduplication operation may generally include comparing unaligned portions of user data pages to identify equivalent portions to use for deduplication. For example and referring also to FIG. 6, performing an unaligned deduplication operation on user data pages 500, 506 may include comparing data to the left and right of (i.e., portions of data before and after) the hash offset reference to determine if they are equivalent. As shown in FIG. 6, arrows to the left and right of hash offset references 508, 510 indicate directions deduplication process 10 may identify portions of data from for unaligned deduplication. Deduplication process 10 may compare any length or amount of data in either direction from the hash offset references within the scope of the present disclosure. As described above, in response to identifying equivalent portions, deduplication process 10 may perform deduplication by saving user data page 500 as a metadata page including a pointer to identified user data page 506. In this manner, deduplication process 10 may enhance the efficiency of storage system.

Figure 7:
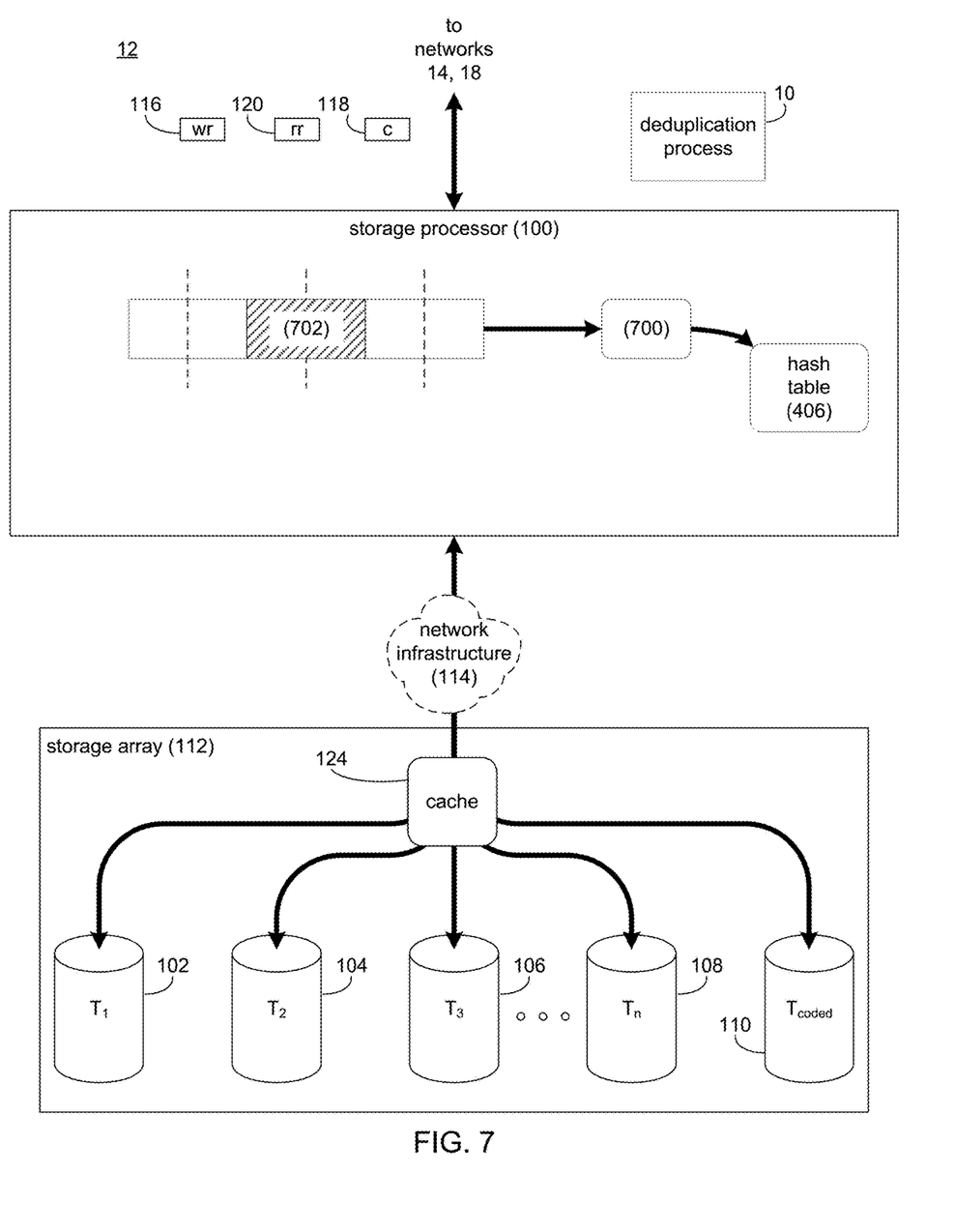

In some implementations, deduplication process 10 may determine 316 that the generated unaligned hash representation of the received user data page is not present within the hash table. Referring also to FIG. 7 and as discussed above, deduplication process 10 may compare generated hash representation 700 of received user data page 702 to determine that hash table 406 does not include a matching hash representation. Accordingly, deduplication process 10 may store 318 the generated unaligned hash representation of the received user data page in the hash table. For example, deduplication process 10 may store 318 generated unaligned hash representation 700 of received user data page 702 in hash table 406 for future deduplication operations.

In some implementations, deduplication process 10 may maintain the hash representations of the hash table by monitoring for changes in the storage of corresponding user data pages within the storage system. For example, deduplication process 10 may invalidate hash representations from the hash table when corresponding user data pages are removed from the storage system. In this manner, deduplication process 10 may dynamically maintain the hash table for performing deduplication operations on user data pages stored within the storage system.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving a user data page for storing in a storage system;
   generating an unaligned hash representation of the received user data page;
   identifying the generated unaligned hash representation within a hash table, thus defining an identified hash representation;
   identifying a user data page associated with the identified hash representation, thus defining an identified user data page;
   comparing a hash offset reference of the identified user data page with a hash offset reference of the received user data page, wherein the hash offset reference is a deterministically defined anchor point in the user data page configured to indicate where to start performing a hash operation on the user data page, wherein the hash offset reference of the identified user data page and the hash offset reference of the received user data page are defined by generating a hash for each byte of each user data page and deterministically selecting a particular byte to be the hash offset reference for each user data page;
   performing a deduplication operation on the received user data page based upon, at least in part, the comparison of the hash offset reference of the identified user data page with the hash offset reference of the received user data page, wherein performing the deduplication operation includes performing an unaligned deduplication operation when the hash offset reference of the identified user data page and the hash offset reference of the received user data page are nonequivalent, wherein the unaligned deduplication operation includes comparing portions of data before and after the hash offset reference in the identified user data page to determine if they are equivalent, wherein the unaligned deduplication operation considers any length or amount of data before or after the hash offset reference within the identified user data page; and
   dynamically maintaining the hash table for performing the deduplication operation on the user data page stored within the storage system by invalidating hash representations from the hash table when corresponding user data pages are removed from the storage system.

2. The computer-implemented method of claim 1, wherein performing the deduplication operation includes performing a first type of deduplication operation when the hash offset reference of the identified user data page and the hash offset reference of the received user data page are equivalent.

3. The computer-implemented method of claim 2, wherein the first type of deduplication operation is an aligned deduplication operation.

4. The computer-implemented method of claim 1, further comprising:
   determining that the generated unaligned hash representation of the received user data page is not present within the hash table.

5. The computer-implemented method of claim 4, further comprising:
   storing the generated unaligned hash representation of the received user data page in the hash table.

6. A computer program product residing on a non-transitory computer readable medium having a plurality of instructions stored thereon which, when executed by a processor, cause the processor to perform operations comprising:
   receiving a user data page for storing in a storage system;
   generating an unaligned hash representation of the received user data page;
   identifying the generated unaligned hash representation within a hash table, thus defining an identified hash representation;
   identifying a user data page associated with the identified hash representation, thus defining an identified user data page;
   comparing a hash offset reference of the identified user data page with a hash offset reference of the received user data page, wherein the hash offset reference is a deterministically defined anchor point in the user data page configured to indicate where to start performing a hash operation on the user data page, wherein the hash offset reference of the identified user data page and the hash offset reference of the received user data page are defined by generating a hash for each byte of each user data page and deterministically selecting a particular byte to be the hash offset reference for each user data page;
   performing a deduplication operation on the received user data page based upon, at least in part, the comparison of the hash offset reference of the identified user data page with the hash offset reference of the received user data page, wherein performing the deduplication operation includes performing an unaligned deduplication operation when the hash offset reference of the identified user data page and the hash offset reference of the received user data page are nonequivalent, wherein the unaligned deduplication operation includes comparing portions of data before and after the hash offset reference in the identified user data page to determine if they are equivalent, wherein the unaligned deduplication operation considers any length or amount of data before or after the hash offset reference within the identified user data page; and dynamically maintaining the hash table for performing the deduplication operation on the user data page stored within the storage system by invalidating hash representations from the hash table when corresponding user data pages are removed from the storage system.

7. The computer program product of claim 6, wherein performing the deduplication operation includes performing a first type of deduplication operation when the hash offset reference of the identified user data page and the hash offset reference of the received user data page are equivalent.

8. The computer program product of claim 7, wherein the first type of deduplication operation is an aligned deduplication operation.

9. The computer program product of claim 6, wherein the operations further comprise:
determining that the generated unaligned hash representation of the received user data page is not present within the hash table.

10. The computer program product of claim 9, wherein the operations further comprise:
storing the generated unaligned hash representation of the received user data page in the hash table.

11. A computing system comprising:
a memory; and
a processor configured to receive a user data page for storing in a storage system, wherein the processor is further configured to generate an unaligned hash representation of the received user data page, wherein the processor is further configured to identify the generated unaligned hash representation within a hash table, thus defining an identified hash representation, wherein the processor is further configured to identify a user data page associated with the identified hash representation, thus defining an identified user data page, wherein the processor is further configured to compare a hash offset reference of the identified user data page with a hash offset reference of the received user data page, wherein the hash offset reference is a deterministically defined anchor point in the user data page configured to indicate where to start performing a hash operation on the user data page, wherein the hash offset reference of the identified user data page and the hash offset reference of the received user data page are defined by generating a hash for each byte of each user data page and deterministically selecting a particular byte to be the hash offset reference for each user data page, wherein the processor is further configured to perform a deduplication operation on the received user data page based upon, at least in part, the comparison of the hash offset reference of the identified user data page with the hash offset reference of the received user data page, wherein performing the deduplication operation includes performing an unaligned deduplication operation when the hash offset reference of the identified user data page and the hash offset reference of the received user data page are nonequivalent, wherein the unaligned deduplication operation includes comparing portions of data before and after the hash offset reference in the identified user data page to determine if they are equivalent, wherein the unaligned deduplication operation considers any length or amount of data before or after the hash offset reference within the identified user data page, and wherein the processor is further configured to dynamically maintain the hash table for performing the deduplication operation on the user data page stored within the storage system by invalidating hash representations from the hash table when corresponding user data pages are removed from the storage system.

12. The computing system of claim 11, wherein performing the deduplication operation includes performing a first type of deduplication operation when the hash offset reference of the identified user data page and the hash offset reference of the received user data page are equivalent.

13. The computing system of claim 12, wherein the first type of deduplication operation is an aligned deduplication operation.

14. The computing system of claim 12, wherein the processor is further configured to:
determine that the generated unaligned hash representation of the received user data page is not present within the hash table; and
store the generated unaligned hash representation of the received user data page in the hash table.

* * * * *